Aug. 26, 1952 — E. T. WYMAN — 2,608,235
VALVE STRUCTURE FOR PNEUMATIC TIRES HAVING DUAL TUBES
Filed Jan. 31, 1950 — 2 SHEETS—SHEET 1
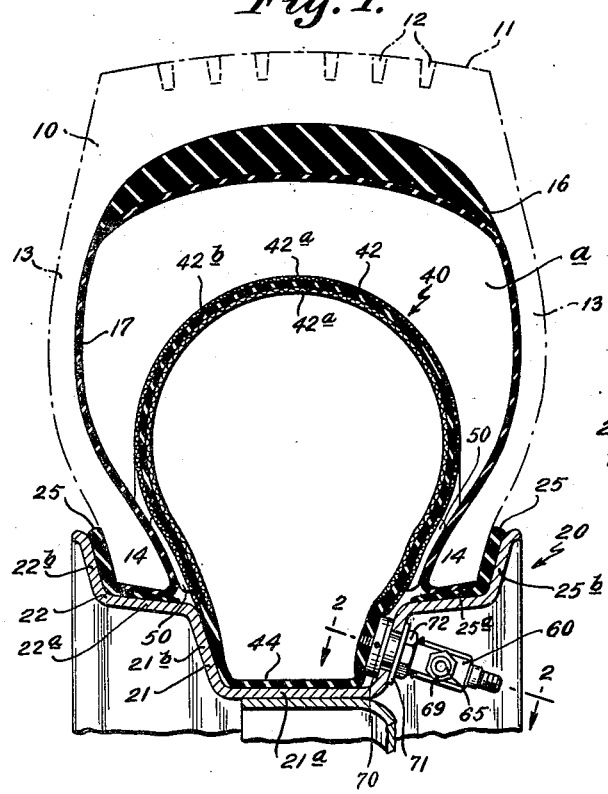
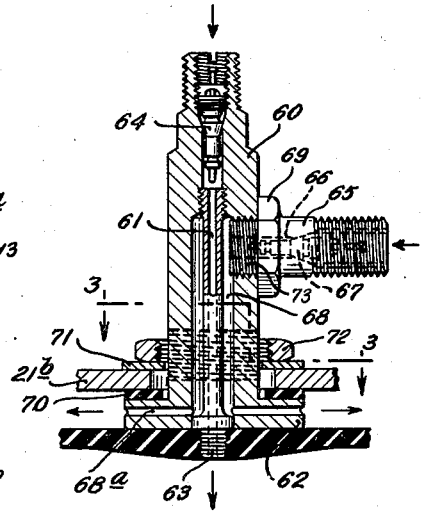
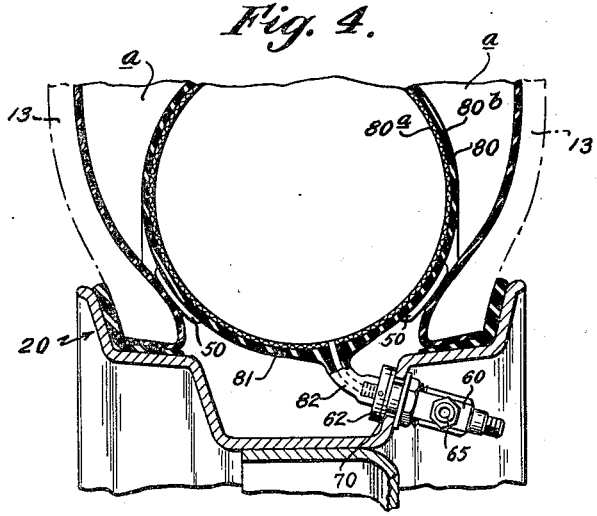
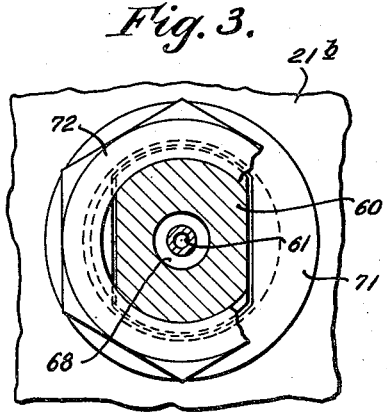
Inventor,
Edwin T. Wyman,
by Dike, Calver + Porter
Att'ys.

Aug. 26, 1952 E. T. WYMAN 2,608,235
VALVE STRUCTURE FOR PNEUMATIC TIRES HAVING DUAL TUBES
Filed Jan. 31, 1950 2 SHEETS—SHEET 2

Inventor,
Edwin T. Wyman,
by Dike, Calver + Porter
Attys.

Patented Aug. 26, 1952

2,608,235

UNITED STATES PATENT OFFICE 2,608,235

VALVE STRUCTURE FOR PNEUMATIC TIRES HAVING DUAL TUBES

Edwin T. Wyman, Brookline, Mass.

Application January 31, 1950, Serial No. 141,502

5 Claims. (Cl. 152—340)

This invention relates to a valve structure for pneumatic tires having dual air chambers, such as the standard "inner tube" with inserted auxiliary or "safety tube," or a so-called "tubeless tire," lacking an "inner tube" as such, and in which the interior chamber of the tire casing forms an inflatable tube or cavity and carries an inserted safety tube. Preferably the respective air chambers are structurally separate, but they may be integrally connected. But the air chamber should be separately inflatable and have no inter-communicating air passages.

For that situation I have devised a single valve structure whereby both tubes may be separately inflated. Because there is no inter-communication between the two tubes, it will be understood that should the other inflatable tube become deflated through a puncture, blow-out or for other cause, the auxiliary or safety tube will support the vehicle indefinitely and independently of the collapsed outer air chamber, which may be the so-called standard "inner tube," or the so-called "tubeless tire" casing. For such a valve structure to be practical, however, it is of the utmost importance that it be simple and inexpensive to manufacture and to install, be efficient in operation, and relatively leak-proof. The previous valve structures with which I have been familiar, and which have been used for inflating dual tubes or tires as above described have all been objectionable or impractical for one or more reasons, and do not obtain as completely the results and advantages achieved by my present valve structure. The complicated mechanism inside the valve stem and the leakage of air from the stem, as in valves where the stem is screwed down to close one of the air passages, is eliminated.

Briefly my valve structure comprises a single main valve stem having two standard separate air valves operating through two separate air passages, by which the safety tube and tire casing are separately inflated. The valve stem is vulcanized at its base at proper position in the side of the auxiliary or safety tube, the base carrying a part, through which the latter tube is inflated. A detachable branching valve stem secured to the main stem carries the second air valve, by which, through a separate air passage, the tire casing is inflated. The detachable valve stem permits the safety tube to be readily installed on the rim inside the outer air chamber. With my valve structure there is thus no possibility of communication between the inner and outer air chambers (of the safety tube, and tire casing, respectively) and the motorist can readily test at any time the exact amount of air pressure in each chamber.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a side elevation showing my valve structure as mounted in a tubeless safety tire;

Fig. 2 is an enlarged longitudinal sectional view of the same valve on lines 2—2 of Fig. 1;

Fig. 3 is a horizontal section on line 3—3 of Fig. 2;

Fig. 4 is a side elevation of the tube shown in Fig. 1 but adapted to a different type of safety tube.

Figure 5:
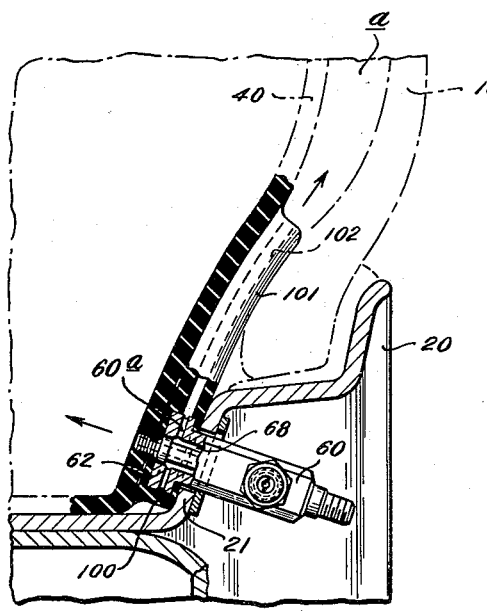
Fig. 5 is a side elevation of the valve structure as used in another modified form of safety tube.

It will be understood that my valve structure is designed particularly to be used in a tubeless safety tire.

My valve structure, however, is obviously not limited thereto, but it is adapted to be used in any type of pneumatic tire having dual inflated air chambers, one being the ordinary outer air chamber of either the standard inner tube type, or the "tubeless" type previously mentioned, and the second being the auxiliary safety tube which supports the vehicle independently when the outer air chamber collapses because of a "blow-out," puncture or the like.

In the drawings 10 represents a standard rubber tire casing having a tread portion 11 with grooves 12 formed in the tread portion and having side walls 13 and beaded edges 14. It will be understood that the beaded edge 14 is usually stiffened and strengthened with annular wire strands (not shown) which run around the tire inside the beaded edge 14. A lining or thick coating 16 of a self-sealing plastic compound of any suitable nature is provided on the interior of the tire 10 beneath its tread surface, which is designed to seal punctures and holes caused by nails and other objects piercing the tread surface. A rubber lining 17 is preferably provided on the interior of the tire casing 10 and over the coating 16 to prevent diffusion of air into the walls of the tire and possible separation of the fabric cords therein from the surrounding rubber material.

The standard tire casing 10 thus described is adapted to be mounted on a standard wheel rim which, as shown in the drawings (Figs. 1, 4, and 5), is of the standard drop-center type having the drop-center portion 21 comprising the bottom wall 21a, side walls 21b, and angular recesses 22 at the sides thereof, comprising bottom wall 22a and side wall 22b, into which the angular outer surface of the beaded edges 14 of the tire 10 are designed to fit.

A separate pair of annular bands of rubber 25 may be provided as shown, preferably having two preformed angularly disposed parts or surfaces 25a and 25b, which bands are designed to fit into the angular recesses 22 at the sides of the rim 20, and between the tire and the rim, and to receive the angular edge of the beads 14 of the tire casing 10 (as shown in Figs. 1, 4 and 5).

An auxiliary or safety tube 40 of rubber, entirely separate from the tire casing 10, is provided to be inserted within the tire casing 10 and closely hug, when inflated, the drop-center portion 21 of the rim 20, as shown in Fig. 1. The safety tube of Fig. 1 comprises the outer wall 42, preferably inextensible in nature, and formed of two or more layers of cord or woven fabric 42a and one or more layers of rubber 42b suitably arranged. An inner base wall or belly 44 formed of stretchable material such as sheet rubber is vulcanized to the outer wall 42 at its adjoining edges adjacent the bead engaging zone of the tube 40. As shown in Fig. 1, it will be noted that the bottom wall 44 is extended on inflation to engage the inner drop-center portion 21 of the rim 20. Means is provided to permit passage of air around the sides of safety tube 40 into the outer chamber a of the tire casing 10 which in the form shown in Fig. 1 comprises an annular row of spaced ridges 50 with grooves therebetween constituting air passages into the outer chamber a of tire casing 10. In Fig. 5 a modified form of communicating air passage is shown.

As shown in Figs. 1, 2, 3, 4 and 5, my valve structure comprises a single valve stem 60 having a central longitudinal air passage 61 therethrough which leads into the safety tube. A standard valve member 64 is carried into the central air passage 61, but as this is a standard construction, it need not be described in detail. A separate detachable branching valve stem 65 is provided, to be inserted into the side of main valve stem 60 by means of a threaded base 73 in a cooperating threaded aperture therefor, and is maintained therein by means of threaded lock nut 69. Detachable valve stem 65 again carries a central air passage 66 with standard valve member 67 inserted therein. Central air passage 66 leads into air passage 68 provided in main valve stem 60 parallel to central air passage 61 but not in communication therewith. As shown in Figs. 2 and 3, air passage 68 surrounds air passage 61. Air passage 68 then extends laterally at 68a through the flanged base 62 of the main valve structure 60, to communicate with the space or outer chamber a of the tire casing 10. It will thus be seen that branching valve stem 66 with air passage 68 and 68a is the means for inflating the tire casing 10 separately and apart from the safety tube 40 or 80.

Means is provided for clamping the valve structure to the side wall 21b of the rim 20, which includes the base flange 62 integral with the valve stem 60. Such means includes a rubber washer 70, the retaining ring or washer 71, and the threaded nut 72. It will be noted (Fig. 2) that the side wall 21b of the rim 20 is held securely clamped between the rubber washer 70 and retaining ring 71, which are tightly clamped together by means of threaded nut 72. If desired, an additional rubber washer may be interposed on the outside of the side wall 21b of the rim. As seen in Fig. 3, two longitudinal sides of the valve stem 60 are preferably flat and parallel, so that the branching valve stem 65 may be mounted on the valve stem 60 and secured by means of lock nut 69.

In use, the safety tube 40 is first placed inside the tire casing 10 and both are mounted on the rim 20 in the conventional manner. The valve stem 60, being vulcanized in proper position on the side of safety tube 40, with branching valve stem 65 detached therefrom, is then inserted through a suitable aperture provided therefor in side wall 21b of the rim 20. The annular rubber bands 25 are then stretched and placed in position in the angular recess 22 of the rim 20 between the beaded edge 14 of the tire casing 10, and the recess 22 of the rim 20. The bands 25 being in place, and the branching valve stem 65 being inserted in the side of main valve stem 60, and the nut 69 being screwed thereon, the safety tube 40 is inflated through main valve stem 60 and central air passage 61, and port 63 which communicates directly with the interior of the safety tube 40. The tire casing 10 is inflated through the branching valve stem 65. It will be remembered that the air proceeds through air passage 68 and its lateral extension 68a, through the air passages provided at the sides of the safety tube 40 between the spaced ridges 50, and thence into the chamber a of the tire casing 10. It will be noted that air pressure within the outer chamber a of the tire casing 10 and within the safety tube 40 forces the beaded edges 14 of the tire casing 10 tightly against the annular rubber bands interposed between said beaded edges and the angular recess 22 of the rim 20 to form an airtight seal. There being no air communication between safety tube and the outer chamber a of tire casing 10, safety tube 40 will at all times provide an auxiliary safety support for the tire 10, in the event of deflation of the latter through puncture, blow-out or other injury.

In Fig. 4, I have shown a modification of safety tube 80, composed throughout its circumference of inextensible material such as with two or more layers of cord or woven fabric 81a and one or more layers 80b of rubber suitably arranged. The toroidal shaped safety tube 80 is thus substantially circular in shape in cross-section shown in Fig. 4, and the belly or lower portion 81, does not extend into the recess of the drop center 21 of the rim 20. Suitable air passages between safety tube 80 and the inner walls of tire casing 10 are provided, as by means of an annular row of grooves 51 therebetween, as on the first form of safety tube 40. The valve structure is the same as that shown in Figs. 1, 2 and 3, with the exception that the main valve stem is vulcanized to an extended tubular neck 82 extending from the lower or belly portion 81 of the safety tube 80.

Fig. 5 shows a modified form of safety tube 40 in which the annular row of spaced ridges 50 with grooves between is dispensed with for communicating with the chamber a of the tire casing 10. This includes a flat flexible rubber ring 100 mounted around the flanged base 62 of the valve stem 60 and having a lateral extension 101 thereon, enclosing the air passage 102 which is in communication with the lateral extension 60a of the central air passage 68. If desired, another lateral extension (not shown) similar to 101 may be provided, extending into the drop-center 21 of the rim 20 to further vent air to the chamber a between the safety tube 40 and the tire casing 10. Such an additional lateral extension would be particularly useful with respect to the type of safety tube construction shown in Fig. 4.

My invention is not limited to the precise constructions shown herein but may be modified in many details, without departure from the spirit of the invention and within the scope of the claims.

It will, of course, be understood that the term "rubber" as used herein indicates both natural and synthetic rubber and substances having rubber-like properties and characteristics as full equivalents.

In the appended claims, the term "outer tube" refers to the inner tube of the standard tire assembly, or the tire casing of the so-called "tubeless tire," and the term "auxiliary tube" or "safety tube" refers to the second tube carried within the first tube for emergency support of the vehicle in the event of puncture or blow-out of the "outer tube."

I claim:

1. A unitary valve structure for use in inflating pneumatic tires comprising two separate air chambers as used on vehicle wheels, wherein an auxiliary safety tube is carried within an outer chamber without air communication between them, comprising a main valve stem fixed to the auxiliary tube and having an auxiliary passage with a check valve therein for inflating said auxiliary tube, a second valve stem detachably connected to the main valve stem and having an air passage and check valve therein communicating with a second air passage in the main valve stem for inflating said outer chamber, and means for fastening said main valve stem to a vehicle wheel rim.

2. A unitary valve structure for use in inflating pneumatic tires comprising two separate air chambers as used on vehicle wheels, wherein an auxiliary safety tube is carried within an outer chamber without air communication between them, comprising a main valve stem fixed to the auxiliary tube and having a central air passage with a check valve therein communicating with the interior of said auxiliary tube, a second valve stem detachably connected to the main valve stem and having an air passage and check valve therein communicating with a second air passage in the main valve stem leading to the interior of said outer chamber, and means for fastening said main valve stem to a vehicle wheel rim.

3. A unitary valve structure for use in inflating pneumatic tires comprising two separate air chambers as used on vehicles, wherein an auxiliary safety tube is carried within an outer chamber without air communication between them, comprising a main valve stem fixed to the auxiliary tube and having a central air passage with a check valve therein for inflating said auxiliary tube, a laterally projecting branch valve stem detachably connected to the first main valve stem and having an air passage and check valve therein communicating with a second air passage in the main valve stem for inflating said outer chamber, and means for fastening said main stem to a vehicle wheel rim.

4. A unitary valve structure for use in inflating pneumatic tires comprising two separate air chambers as used on vehicle wheels, wherein an auxiliary safety tube is carried within an outer chamber without air communication between them, comprising a main valve stem fixed to the auxiliary tube and having a central air passage with a check valve therein communicating with the interior of said auxiliary tube, a second valve stem detachably connected to the main valve stem and having an air passage and check valve therein communicating with a second air passage in the main valve stem surrounding the central air passage in the main valve stem leading to the interior of said outer chamber, and means for fastening said main valve stem to a vehicle wheel rim.

5. A unitary valve structure according to claim 1 in which the main valve stem has a flanged base with ports extending laterally therein connecting with said second air passage in the main valve stem for inflating said outer chamber.

EDWIN T. WYMAN.

REFERENCES CITED

The following references are of record in the file of this patent:

UNITED STATES PATENTS

| Number | Name | Date |
| --- | --- | --- |
| 804,613 | Magowan | Nov. 14, 1905 |
| 1,541,125 | Dunn | June 9, 1925 |
| 1,626,511 | Clark | Apr. 26, 1927 |
| 1,650,502 | Ehrler | Nov. 22, 1927 |
| 1,653,054 | Mack | Dec. 20, 1927 |
| 2,189,485 | Crowley | Feb. 6, 1940 |
| 2,272,548 | Creamer | Feb. 10, 1942 |